United States Patent Office 3,548,584
Patented Dec. 22, 1970

3,548,584
HIGH MOLECULAR WEIGHT ORIENTED POLYAMIDE TEXTILE YARN
Bernard Silverman, Raleigh, N.C., and Leslie E. Stewart, Pensacola, Fla., assignors to Monsanto Company, St. Louis, Mo., a corporation of Delaware
No Drawing. Filed Dec. 15, 1967, Ser. No. 690,782
Int. Cl. C08g 20/20; D02g 3/02
U.S. Cl. 57—140                           2 Claims

ABSTRACT OF THE DISCLOSURE

Oriented nylon fibers are provided which have an $[\eta]$ of more than 1.3 and a viscosity average molecular weight greater than 35,000. The fibers are composed of linear polyamides, i.e., those which are soluble in formic acid. The dimensional stability of these fibers is vastly improved over conventional nylon tire cords. The tenacity and toughness of the fibers also are significantly improved.

BACKGROUND OF THE INVENTION

(a) Field of the invention

This invention is directed to fibers composed of polyamides. These fibers are particularly useful as reinforcing elements for articles, such as, tires, belts, etc.

(b) Description of the prior art

Polyamide fibers, such as nylon, have long been recognized as useful as reinforcement for articles such as vehicle tires. Their high tenacity, and resistance to fatigue and abrasion made them preferable to other fibers, such as rayon and cotton, in this use. There are, of course, constant attempts being made to improve the characteristics of such polyamide fibers. A major characteristic sought to be improved is tenacity. However, it is not desirable that an improvement in one characteristic be brought about to the detriment of others. For example, while it is desirable to have a higher tenacity, it would not be advantageous to increase tenacity at the expense of elongation. The toughness of a nylon fiber is normally measured as a function of the tenacity and the elongation. Thus, if tenacity increased and elongation decreased, the toughness of the nylon would not gain appreciably.

Another prime characteristic to be considered in nylon tire yarns and cords is their dimensional stability. While this characeristic is rather hard to define it is generally a function of the Young's modulus and the compliance stability of the yarns and cords. Tires made with nylon tire cords are widely known for their tendency to flatspot. It is believed that flatspotting occurs because of deficiencies in their dimensional stability. That is, the cords tend to vacillate in their dimensions under the varied conditions of use that a vehicle tire normally undergoes. One result of this instability is flatspotting.

Recently advances in the chemistry of polyamides have resulted in the production of polyamide molding powder having greatly increased intrinsic viscosity $[\eta]$, and molecular weight. These properties have been increased by a process known as solid state polymerization. Briefly, this proces is carried out by heating granules or flakes of polyamides to temperatures below their melting points but high enough to allow the amide and acid ends of the molecule to react, thus increasing the length of the molecules. Generally, it has been found that stirring of the particles enhances the polymerization process. It was of course recognized that it would be desirable to be able to produce nylon fibers from this high relative viscosity (RV), high molecular weight material since it was postulated that the other desirable properties of such fibers would also be greatly enhanced.

However, attempts to spin fibers from such highly polymerized material have resulted in major problems. In the first place, if the high molecular weight nylon is melted for a time sufficient to allow the crystalline order of the polyamide to be destroyed, then degradation occurs which results in lower $[\eta]$ and lower molecular weight. On the other hand if the polyamide is not held in the melt for a time sufficient to destroy its crystalline order, then the resulting fibers are not amenable to orientation by drawing. Thus, while it has been known that polyamides could be made which have a high $[\eta]$ and high molecular weight, the additional property improvements in polyamide fibers have not previously been recognized since useful polyamide fibers having high RV and high molecular weight have not been successfully produced.

SUMMARY OF THE INVENTION

In accordance with this invention there is provided synthetic oriented fibers composed of essentially linear polyamide molecules, said fibers being soluble in formic acid at 25° C. and having an $[\eta]$ of more than 1.3 and preferably above 1.8. The viscosity average molecular weight ($\overline{M}_v$) of the polyamides which make up the fiber is above 35,000 and preferably above 50,000. Also, the number average molecular weight ($\overline{M}_n$) as determined by osmometry is substantially the same value as the weight average molecular weight. This fact is an additional indication of the linearity of the polyamides. The polyamide fibers of this invention are produced by carrying out a solid state polymerization of the polyamide molecules which make up the fibers, while the polyamide is in the form of a drawn, oriented fiber. It is somewhat surprising that solid state polymerization could take place while the nylon is in the form of a drawn, oriented fiber inasmuch as it was believed that movement of particles was a great aid in carrying out such a process. Nevertheless, in accordance with this invention, it has been found that treatment of polyamide fibers so as to affect solid state polymerization of the polyamide molecules, results in fibers which have greatly increased molecular weight and $[\eta]$. Also, these fibers have significantly improved tenacity and toughness of the fibers likewise is increased. Furthermore, these fibers are much more dimensionally stable than conventional polyamide fibers, showing improvement in Young's modulus and in compliance stability.

As used herein the term "Young's modulus" is defined as $$E = \frac{Sl}{\Delta l}$$

where

E = Young's modulus
S = Applied stress in force per unit cross section area
$l$ = Original length
$\Delta l$ = Change in length.

As used herein the term "compliance stability" is defined as $$\left(\frac{1}{E}\right)_{T_1} - \left(\frac{1}{E}\right)_{T_2} = \text{Comp. Stabl.}$$

In all cases cited $S = 0.5$ g./d., therefore, the compliance stability may be expressed as $$\left(\frac{\Delta l}{l}\right)_{T_1} - \left(\frac{\Delta l}{l}\right)_{T_2} \times 100\%$$

which is the change in percent elongation, abbreviated as $$\Delta \% \left(\frac{\Delta l}{l}\right)_{T_1 - T_2}$$

and $T_1$ and $T_2$ are the temperatures at which E is measured.

As used herein, intrinsic viscosity [$\eta$] is defined as $$C \xrightarrow{\text{limit}} O\left(\frac{\log_e N_r}{C}\right)$$

where $N_r$ is a relative viscosity of a dilute solution of the polymer in formic acid at 25° C. and C is the concentration in grams of polymer per 100 cc. of solution. The term "viscosity average molecular weight" is defined as $$\overline{M}_r = 24,650[\eta]^{1.272}$$

In accordance with the process of this invention polyamide fibers, such as polyhexamethylene adipamide fibers with or without the usual additives, e.g., $TiO_2$, copper, potassium salts, phosphorus, etc., are subjected to temperatures of from 120° C.–230° C. for a period of between 30 minutes and 24 hrs. in the absence of oxygen. Of course, time and temperature are dependent on each other to the extent that higher temperatures require a shorter period of time to affect the desired result. It is most important, however, that the heating be carried out in the absence of oxygen. This may be done by any desired means, for example, under a blanket of an inert gas, such as nitrogen, or under vacuum. Ordinarily, the fibers are wound onto a package which is then heated. However, this is only a convenient way to carry out the process and the fibers may be in any other desired form.

As noted, besides the improvement in [$\eta$] and molecular weight, the fibers of this invention are also unexpectedly and significantly improved in that group of properties which determine the dimensional stability of the polyamide fibers. This is a very important property in such fibers since it is determinative of the performance capability of fibers when used as a reinforcing material in, for example, automobile tires. The current value of commercial fibers of this composition for use as tire cord is a Young's modulus of 22 at 80° C. and 30 percent relative humidity (RH), a compliance stability of about 1.4 at 25°–75° C. The nylon fibers of this invention have a Young's modulus of greater than 30 at 80° C. (30% RH) and preferably above 35 at 80° C., 30% RH and a compliance stability of less than 0.85 and preferably less than 0.75. It can thus be seen that the oriented fibers composed of linear, high molecular weight polyamides of this invention have excellent dimensional stability and in fact satisfy a long standing industrial need.

DESCRIPTION OF THE PREFERRED EMBODIMENTS

Example I

The following example is presented in tabular form to illustrate general and specific property improvement of commercially available nylon polymer. The samples that were used for these tests were laboratory spun and drawn yarns obtained from polyhexamethylene adipamide of two types designated type A and type B. The two experimental samples were subjected to the low temperature, solid state polymerization process, while the control samples were not. From the data presented in the following table it is clearly shown that marked improvements were obtained in intrinsic viscosity, compliance stability, tenacity, elongation and initial modulus by the process of this invention.

TABLE I

| | Yarn type | | |
|---|---|---|---|
| | A | B | Control |
| | SSP conditions | | |
| | 18 hr., 140° C. 8mm. | 8 hr., 160° C. 8 mm. | None |
| $\eta$ intrinsic viscosity | 1.6 | 1.81 | 1.31 |
| $\overline{M}_v$ | 45,000 | 52,000 | 35,000 |
| Compliance stability, 25–75° C. at 30% RH | 0.81 | 0.86 | 1.73 |
| Creep rate (75° C., 30% RH) | 0.02 | 0.03 | 0.05 |
| Tenacity g./d | 7.28 | 7.49 | 5.65 |
| Percent elongation | 19.8 | 17.4 | 15.1 |
| Modulus g./d | 55 | 51 | 38 |

It will also be noted that the elongation and tenacity both show increases. This, of course, indicates that the toughness of the fibers is improved.

The most surprising and important result that is achieved with this invention is the dimensional stability of the product. While heretofore, dimensional stability could be obtained at low temperatures and 0% relative humidity only, with the higher molecular weight nylon of this invention this property is greatly improved both at elevated temperatures and at higher relative humidities. These results were unexpected. The following table shows the improvement in dimensional stability as measured by the change in elongation under constant load over broad temperature and moisture content ranges.

TABLE II

| | At 0% RH | | |
|---|---|---|---|
| | A-SSP | Control | B-SSP |
| Compliance stability: | | | |
| (25–75° C.) | 0.73 | 0.75 | 0.65 |
| (25–100° C.) | 0.80 | 1.39 | 0.94 |
| | At 30% relative humidity | | |
| (25–75° C.) | 0.81 | 1.73 | 0.86 |
| (25–100° C.) | 0.98 | 2.23 | 1.02 |
| | At 100° C. | | |
| 0%–30% RH | 0.18 | 0.84 | 0.08 |

It should be noted that in all cases the higher molecular weight yarns had lower elongation differences, i.e., better compliance stability, under all conditions cited. It should also be noted that the improvement was considerable, being anywhere between about 50% and 250%, depending upon the condition and sample tested.

Example II

In addition to the improvements shown in Example I solid state polymerization causes an increase in Young's modulus, E, and less dependence of E on moisture content. These improvements are very important in increasing flatspotting resistance in tire yarns and are shown in the following table:

TABLE IV

| | Young's moduli of nylon yarns | | | |
|---|---|---|---|---|
| | E at 0% RH | | E at 30% RH | |
| | SSP, g./d. | Control, g./d. | SSP, g./d. | Control, g./d. |
| Temperature (° C.): | | | | |
| 80 | 42 | 31 | 37 | 22 |
| 100 | 32 | 24 | 27 | 16 |
| 120 | 25 | 18 | 19 | 11 |

Example III

As stated, the process that is used for solid state polymerization, according to this invention, of heating the solidified polymer at a temperature below the melting point while in the absence of oxygen.

In this example, two commercially available nylon polymer samples were subjected to 160° C. under 8 mm. Hg after having been dried with nitrogen for 48 hours at 71° C.

TABLE V

[Increased intrinsic viscosity [$\eta$] of nylon by low temperature solid state polymerization]

| | Initial | Final |
|---|---|---|
| Sample identification: | | |
| A | 1.5 | 4.3 |
| B | 1.3 | 3.0 |

It can be seen that the intrinsic viscosity of each sample more than doubled in each case clearly demonstrating the marked effect on polymer molecular weight by the process of this invention.

Example IV

The temperature at which one chooses to conduct the polymerization is in the range of 120° C. to 230° C. It is well known that reaction rates are dependent on temperature and that the rate is some logarithmic function of absolute temperature. This relationship is shown clearly in the following table where the molecular weight of commercially available nylon, as indicated by $[\eta]$ increases with increasing temperature while reaction time and pressure were held constant at 18 hours and 8 mm. Hg, respectively.

TABLE VI

[The effect of temperature on intrinsic viscosity $[\eta]$, at 18 hours and 8 mm. Hg]

| Sample Ident.: | Original $[\eta]$ | 120° C. $[\eta]$ | 340° C. $[\eta]$ | 160° C. $[\eta]$ | 180° C. $[\eta]$ |
|---|---|---|---|---|---|
| A | 1.3 | 1.4 | 1.9 | 3.0 | 5.4 |
| B | 1.5 | 1.5 | 2.3 | (1) | (1) |

1 Insoluble.

Example V

The pressure at which one chooses to conduct the solid state polymerization is also not critical. At constant temperature and time it was found that the increase in molecular weight, as indicated by intrinsic viscosity, varies inversely with pressure, and this relationship is shown clearly in the table.

TABLE VII

[The effect of pressure on intrinsic viscosity $[\eta]$, at 38 hours and 360° C.]

| Sample ident.: | Original | 8 mm. Hg. | 20 mm. Hg. | 40 mm. Hg. | 850 mm. Hg. |
|---|---|---|---|---|---|
| E | 1.5 | (1) | 3.6 | 2.9 | 1.8 |
| F | 1.3 | 3.0 | 2.6 | 2.2 | 1.5 |

1 Insoluble.

Example VI

The improvement in properties that result from the process of this invention can be ascribed to the fact the linear configuration of the original molecular species has been retained. For, if a branched or cross-linked structure resulted from this process, an entirely different set of properties would be obtained. This example is given to provide evidence that in accordance with this invention, the fibers do, in fact, have a linear polymeric structure after polymerization. The evidence consists of measuring molecular weight by two different methods. The molecular weight $(\overline{M}_n)$ calculation by end group analysis (titration) is based on the assumption that there are two titratable groups (ends) per molecule. To confirm the validity of this assumption, another method of measuring molecular weight is required, preferably one that measures a colligative property. Osmometry fills this need. Molecular weight measurements by osmometry are shown with molecular weights found by end group analysis in the table below. It can be seen that there is close agreement in the results found by two different methods, chemical and physical.

TABLE VIII.—MOLECULAR WEIGHTS OF SOLID STATE POLYMERIZED NYLONS

| Sample: | Molecular wt. $(\overline{M}_c)$ by osmometry | Molecular wt. $(\overline{M}_n)$ by end group analysis |
|---|---|---|
| A | 47,800 | 44,300 |
| B | 40,000 | 39,600 |
|  | 40,600 | 42,700 |
|  | 39,000 | 43,700 |

The agreement in results is considered to be excellent, since there is a relatively high experimental error in determining $\overline{M}_n$ by both methods.

A further proof of linearity of the ultrapolymerized nylon product, is the difference in the number of end groups after reaction. The basis of this argument resides in the fact there will be a one to one ratio of end groups that will react to form a longer chain, and after polymerization there will be unequivalent reduction of carboxyl *and* amine ends. That this in fact does occur is illustrated in the following table:

TABLE IX.—INITIAL AND FINAL END GROUP ANALYSIS OF SOLID STATE POLYMERIZED NYLON

| Sample identification | COOH orig. | NH$_2$ orig. | COOH final | NH$_2$ final | $\Delta$COOH | $\Delta$NH$_2$ |
|---|---|---|---|---|---|---|
| A | 51.7 | 65.3 | 19.3 | 26.1 | 32.4 | 39.2 |
| B | 90.4 | 44.9 | 58.4 | 6.8 | 32.0 | 38.1 |
| C | 56.8 | 58.0 | 33.3 | 28.4 | 23.5 | 29.6 |
| D | 47.0 | 38.1 | 37.1 | 9.6 | 9.9 | 8.5 |
| E | 64.0 | 50.0 | 36.5 | 19.1 | 27.5 | 30.9 |

Here again it can be seen that the reduction of end groups for acid and amine is about the same for each after ultrapolymerization, indicating the presence of the same linear molecular species.

Example VII

As proof of the ultrahigh degree of polymerization that may be achieved by solid state polymerization the following is included:

A sample of yarn of $[\eta]=1.42$ was subjected to a solid state polymerization at 235° C. for 17 hours at 0.01 mm. Hg. The $[\eta]$ increased to 3.68 which corresponds to a viscosity average molecular weight of about 130,000 and a weight average molecular weight of about 140,000. A sample of this ultrahigh molecular weight yarn was subjected to differential thermal analysis (DTA). The DTA curve showed a sharp peak at 257° C. (indicates linearity). The dimensional stability of this material was vastly superior to an untreated control.

The SSP yarn and its control were conditioned at 80° F. at 65° RH. The yarn was loaded to 0.5 g./d. and the $\Delta/l$ determined after one minute.

TABLE X

| | $\Delta l/l \times 100\%$ | | | | Compliance stability | | |
|---|---|---|---|---|---|---|---|
| | 25° C., percent | 50° C., percent | 75° C., percent | 100° C., percent | 25–50° C. | 25–75° C. | 25–100° C. |
| Control | 3.29 | 4.28 | 4.69 | 4.98 | 0.99 | 1.40 | 1.69 |
| SSP | 1.45 | 1.82 | 1.92 | 2.10 | 0.37 | 0.47 | 6.50 |

Table X indicates that not only is the compliance stability of the products of this invention improved but that also the compliance, or length change, at any one temperature is also significantly improved.

What is claimed is:

1. A spun synthetic oriented linear continuous filament textile polyamide yarn of a dicarboxylic acid and a diamine, soluble in formic acid at 25° C., said polyamide having an intrinsic viscosity [$\eta$] greater than 1.3 and a viscosity average molecular weight above 35,000 and an osmometric average molecular weight in close agreement therewith, characterized by improved dimensional stability by having a Young's modulus greater than 30 at 80° C. and 30 percent relative humidity and a compliance stability less than 1.0 and produced by having been heated in the absence of oxygen and an acid polymerization catalyst at a temperature of 120–230° C. for 30 minutes to 24 hours while wound in the form of a package of drawn yarn.

2. A spun synthetic oriented linear continuous filament textile yarn of polyhexamethylene adipamide, soluble in formic acid at 25° C., having an intrinsic viscosity [$\eta$] greater than 2.5 and a viscosity average molecular weight above 50,000 and an osmometric average molecular weight in close agreement therewith, characterized by improved dimensional stability by having a Young's modulus greater than 35 at 80° C. and 30% relative humidity and a compliance stability less than 0.85 and produced by having been heated in the absence of oxygen and an acid polymerization catalyst at a temperature of 120–230° C. for 30 minutes to 24 hours while wound in the form of a package of drawn yarn.

References Cited

UNITED STATES PATENTS

| | | | |
|---|---|---|---|
| 3,303,169 | 2/1967 | Pitzl | 57—140 |
| 3,343,363 | 9/1967 | Stow et al. | 57—140 |

WILLIAM H. SHORT, Primary Examiner

E. WOODBERRY, Assistant Examiner

U.S. Cl. X.R.

260—78